July 31, 1956  J. M. SCHAEFFER  2,756,444
METHOD OF AND APPARATUS FOR MAKING NUT BLANKS
HAVING AXIALLY EXTENDING SKIRT PORTIONS
Filed April 27, 1953  4 Sheets-Sheet 1

INVENTOR
Joseph M. Schaeffer
BY
Rockwell Bartholow
ATTORNEYS

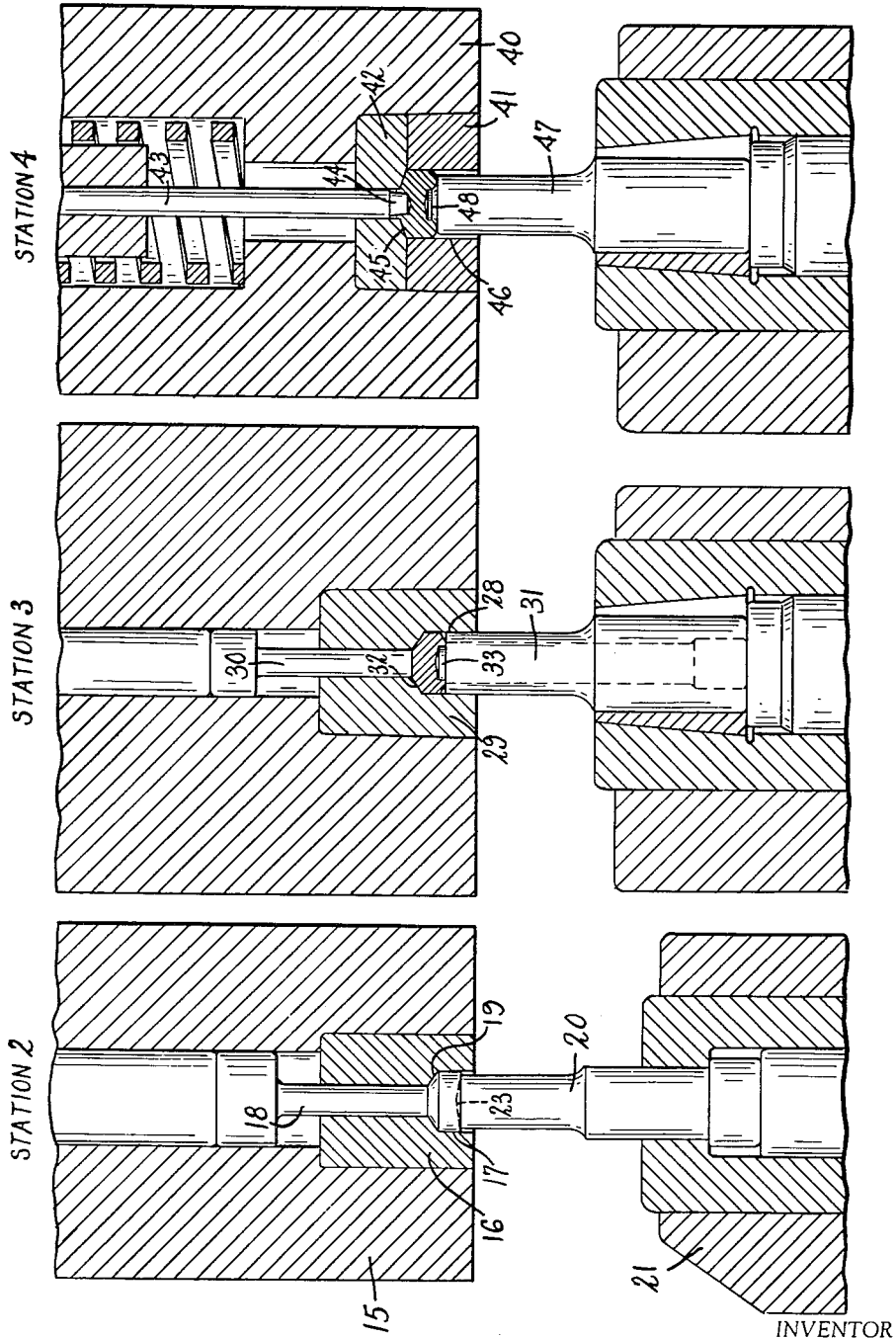

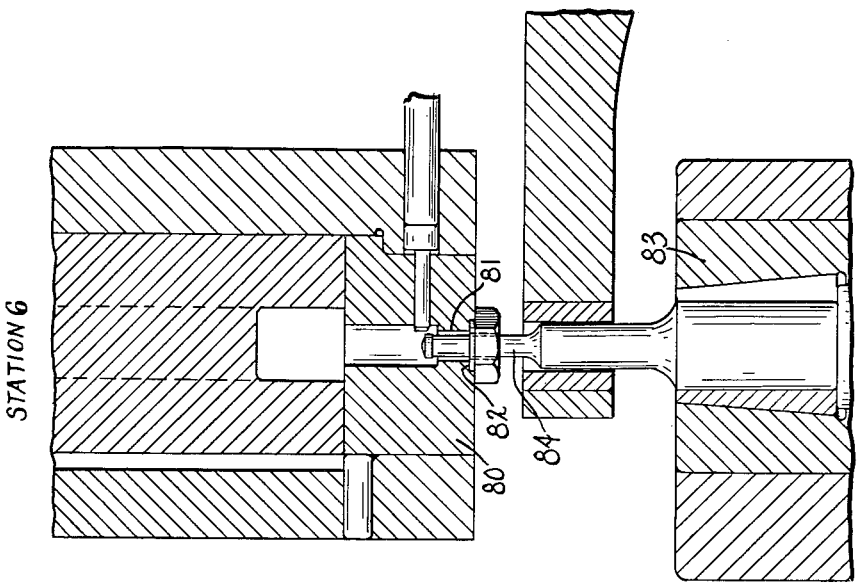
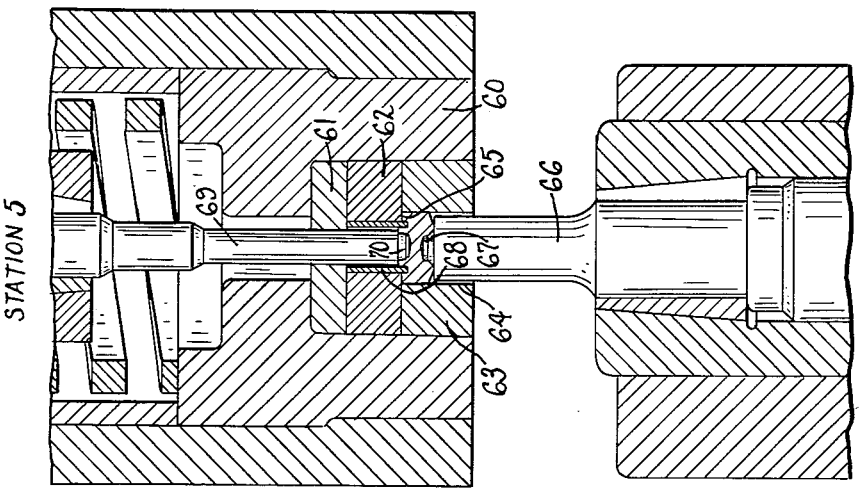
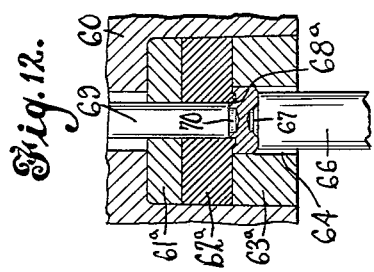
INVENTOR
Joseph M. Schaeffer
BY
ATTORNEYS

July 31, 1956  J. M. SCHAEFFER  2,756,444
METHOD OF AND APPARATUS FOR MAKING NUT BLANKS
HAVING AXIALLY EXTENDING SKIRT PORTIONS
Filed April 27, 1953  4 Sheets-Sheet 4
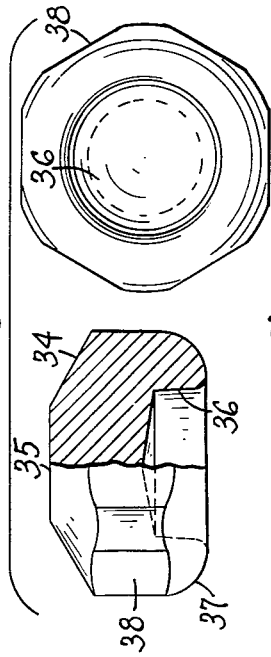
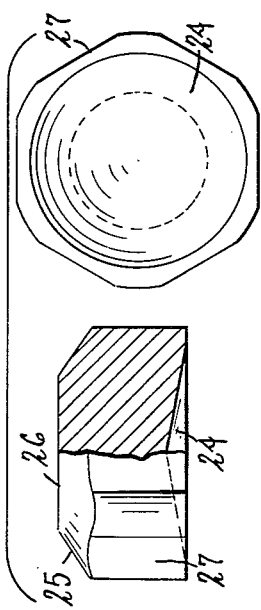
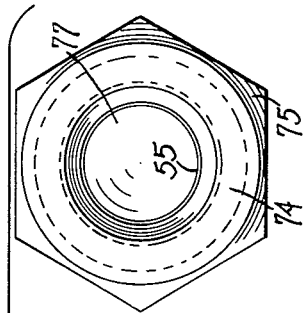
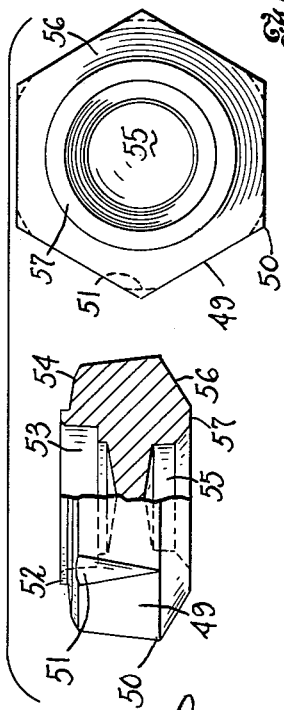
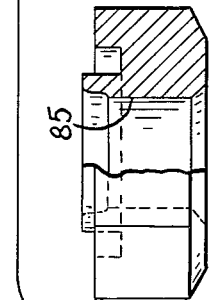
INVENTOR
Joseph M. Schaeffer
BY Rockwell & Bartholow
ATTORNEYS

United States Patent Office 2,756,444
Patented July 31, 1956

2,756,444

METHOD OF AND APPARATUS FOR MAKING NUT BLANKS HAVING AXIALLY EXTENDING SKIRT PORTIONS

Joseph M. Schaeffer, Waterbury, Conn., assignor to The Waterbury Farrel Foundry & Machine Company, Waterbury, Conn., a corporation of Connecticut Application April 27, 1953, Serial No. 351,439

8 Claims. (Cl. 10—86)

This invention relates to a method of and apparatus for making nut blanks and more particularly a blank for a form of lock nut which is provided upon one face thereof with an upstanding annular shoulder surrounding the central opening of the nut and with an annular recess which surrounds this shoulder and which lies between the latter and the outer squared edge portion, as will be more fully explained hereinafter. The method and apparatus are adapted for cold forming a nut of this character in a progressive nut-forming machine wherein a blank or workpiece is cut from a length of stock and transferred through the machine from one station to another for progressive operations thereon.

As shown in the drawings, the method comprises a series of steps consisting of pressing operations at a plurality of stations in the same machine and, as one workpiece is transferred from one station to the next, another is supplied to the first station so that the apparatus performs the several operations upon different workpieces at the same time.

Also, in the process of the present invention the workpiece is turned (face to face) through an angle of 180 degrees between certain of the stations but is carried without such rotation between other stations where it is not desired to reverse the faces of the blank with respect to the tools. It is understood that when the blank is turned in its passage from one station to the next the punch face of the blank at the first of said stations will become the die face of the blank at the next station. Thus turning of the blank facilitates the performing of the necessary operations upon the workpiece to form the nut illustrated by a cold-forming process.

One object of the present invention is to provide a process of cold forming a nut of the character described by a series of pressing or forming operations carried out at separate stations in the same machine.

Still another object of the invention is to provide an apparatus having a plurality of stations, each serving to perform a certain operation upon a nut blank or workpiece, the latter being transferred from one station to another so that the operations are performed progressively as the workpiece is carried through the machine.

Still another object of the invention is to provide an apparatus of the character described for cold forming a nut blank having an opening therethrough and having upon one face thereof an upstanding shoulder surrounding the opening and an annular recess between this shoulder and the squared edge of the blank.

Still another object of the invention is to provide a new and improved process for forming a nut blank of the character described such that the completed nut may be performed in a series of cold-forming operations, the operations being performed progressively upon the nut blank as the latter is carried through the machine.

To these and other ends the invention consists in the novel features and combinations of parts to be hereinafter described and claimed.

In the accompanying drawings:

Fig. 2 is an enlarged sectional view of the tools employed at the second station of the apparatus;

Fig. 3 is a similar view of the tools employed at station No. 3;

Figs. 4 and 5 are enlarged sectional views showing the tools employed at stations Nos. 4 and 5 of the machine and the blanks as formed by the tools;

Fig. 6 is a view of the tools employed at the last or piercing station of the machine;

Figure 1:
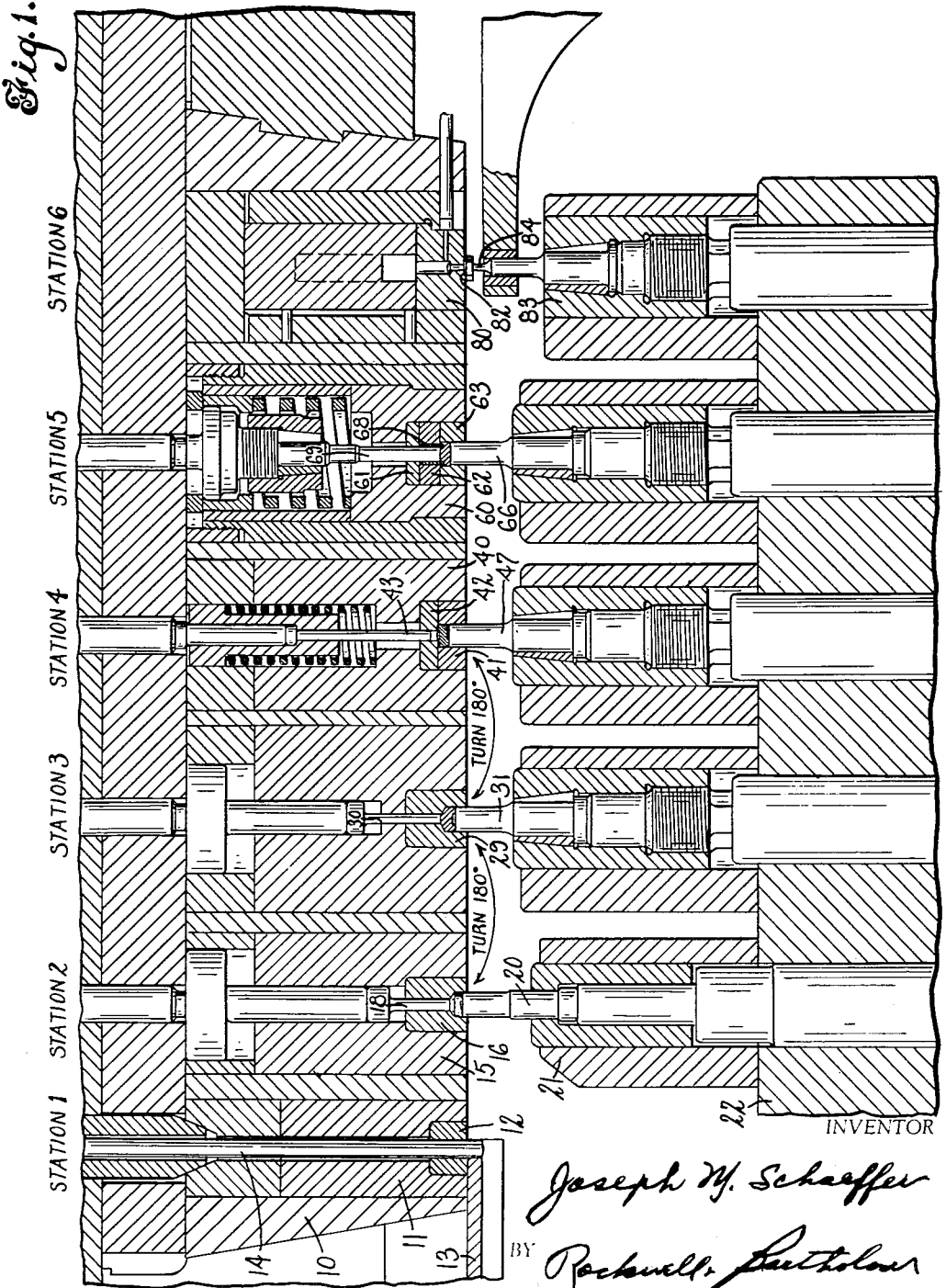
Fig. 1 is a sectional view of the operating stations of a nut-forming machine embodying my invention and which is adapted to carry out my improved process.

Fig. 7 comprises a side view partly in section and a bottom plan view of the workpiece as formed at station No. 2;

Fig. 8 comprises a side view partly in section and a bottom plan view of the workpiece as formed at station No. 3;

Fig. 9 comprises a side view partly in section and a bottom plan view of the workpiece as formed at station No. 4;

Fig. 10 comprises a side view partly in section and a bottom plan view of the workpiece as formed at station No. 5;

Fig. 11 comprises a side view partly in section and a bottom plan view of the completed blank; and Fig. 12 is a sectional view showing an alternative form of die for use at station No. 5.

To illustrate a preferred embodiment of my invention I have shown a die block 10 having therein a die holder 11 by which is carried a cutoff die 12. A cutoff knife 13 is adapted to be reciprocated across the face of the die 12 in order to cut a workpiece of a given length from a piece of stock 14 which is fed forwardly through the opening of the die 11. The workpiece may be carried from this first or cutoff station to the second station in any suitable manner, such, for example, as by the cutoff knife itself.

At station No. 2 the apparatus is provided with a die holder 15 in which is supported a squaring die 16 having an opening 17 to receive the workpiece. A knock-out rod 18 may be operated in any suitable way to eject the blank from the die after a pressing operation.

As shown, the opening or recess in the die is provided with a chamber 19 at its inner end, and the walls of the die recess between this chamfered end and the face of the die are somewhat flattened to form flat surfaces on the side wall of the blank.

The punch employed at this station is shown at 20 and is carried in a punch holder 21 secured to the gate 22 to be reciprocated thereby in the usual manner. The punch is provided with a flattened conical end surface, as shown at 23, to slightly indent the front face of the blank, the term "front" being applied to the punch face of the blank.

At this station in the machine the blank in the die opening 17 is compressed between the ends of the punch 20 and the knock-out rod 18 and formed in the shape shown in Fig. 7. The front or punch face of the blank is indented slightly, as shown at 24, while a distinct chamfered surface 25 is formed at the rear face of the blank surrounding a central flattened portion 26. The side wall of the blank is provided with flat faces 27 which is the beginning of the formation of the hexagonal faces to be provided upon the finished blank.

The blank, after being formed at station No. 2 in the shape shown in Fig. 7, is then transferred to station No. 3 where it is processed in the opening 28 of a die 29 carried by the die block 10. A knock-out rod 30 serves to eject the blank from the die after the forming at this station, and the blank, as shown in section, is compressed between the knock-out rod and the end of a punch 31 carried at this station by the gate 22. The die opening 28 is also provided at its rear end with a chamfered surface 32 to form a similar chamfer upon the blank, and the punch is provided with a projection 33 to indent the front face of the blank.

The shape of the blank after being processed at station No. 3 is shown at Fig. 8. It may here be stated that the blank is turned (face for face) through an angle of 180 degrees in its travel from station No. 2 to station No. 3 so that the die face of the blank at station 2 becomes the punch face at station No. 3 and vice versa. As shown in Fig. 8, a chamfer 34 is formed at the rear face of the blank in Fig. 3 about the central flat 35 which lies against the end of the knock-out rod 30. It will be noted that this chamfered face of the blank is the face which bore the indentation 24 when the blank arrived at this station.

The previously domed face of the blank 25 is operated upon by the punch 31, and a relatively deep indentation 36 is formed in this face of the blank. However, the punch is not allowed to travel sufficiently far to flatten the surface at this face of the blank (which was previously domed as at 25) but there is purposely left a crowned or rounded out end 37 at the outer edge. It will be seen, therefore, that the chamfered face of the blank at station No. 2 becomes the indented face after being processed at station No. 3, and likewise the indented face at station No. 2 becomes the chamfered face at station No. 3. It may also be noted that the die opening 29 is also provided with flattened sides of greater length than those provided at station No. 2 so as to form flats 38 upon the workpiece of greater area than those shown at 27.

The blank is then transferred to station No. 4 and is again turned through an angle of 180 degrees in this transfer operation so that the punch face of the blank at station No. 3 becomes the die face at station No. 4 and vice versa. At this station the apparatus is provided with a die holder 40 in which there is a two-piece die comprising the inserts 41 and 42. The insert 42 is provided with an opening through which the knock-out rod 43 extends, this knock-out rod having a reduced end 44 serving to indent the rear face of the blank.

Also, the insert 42 is chamfered, as shown at 45, so as to shape the rear face of the workpiece in the form shown in Fig. 9, which will be more particularly described herein after. The insert 41 is provided with a die opening 46 having a side wall of hexagonal shape so as to form the blank into substantially true hexagonal form.

The punch at station No. 4 is shown at 47, the punch being provided with a reduced end 48 to form an indentation at the front face of the blank.

After being processed at station No. 4, the blank is in the form shown in Fig. 9 of the drawings. It will be seen that the sides 49 of the blank are of substantially hexagonal form at the front face thereof with the corners being well filled out, as shown at 50. At the rear face, however, the corners are not so sharp as shown at 51 so that the blank tapers inwardly slightly from front to rear as it is not of truly hexagonal shape at its rear face. It has already been stated that the blank has been turned face for face in its transfer to station No. 4 so that the reduced end 44 of the knock-out rod 43 enters the indentation 36. The rounded or crowned end 37 of the blank is compressed against the face of the die insert 42 and, as shown in Fig. 9, the face of the insert is of the proper shape to form an annular ridge or raised rib 52 about the indentation 53 made by the knock-out rod, and between this annular ridge and the edge of the nut is a crowned or chamfered portion 54. The crowned shape at 37 of Fig. 8 is of material assistance in beginning the flow of metal for the rib or ridge 52 which in turn helps create the raised shoulder about the central opening to be later described.

The punch 47 acts upon the flat 35 and dome 34 now at the front or punch face of the nut and forms this face of the nut, as shown in Fig. 9, so as to provide a relatively deep indentation 55 where the flat surface 35 previously existed. The chamfer 34 is reduced to a slight extent, as shown at 56, and a small annular flattened portion 57 is provided between this chamfer and the indentation 55. It will be noted that, while at station No. 4 the corners of the nut have been pretty well filled out into hexagonal shape, this has been done without flattening the front and rear faces as these faces still provide the chamfered portion 56 and the crowned portion 54, as well as the annular ridge or rib 52.

It may here be noted that in turning the blank through the angle of 180 degrees between the stations Nos. 2 and 3 and stations Nos. 3 and 4, any suitable mechanism may be used for this purpose, such, for example, as that shown in the application of myself and Erwin B. Byam, Serial No. 289,085, filed May 21, 1952, now U. S. Patent No. 2,728,267, issued December 27, 1955.

The workpiece in the form shown in Fig. 9 is transferred, without turning, to the fifth station of the apparatus, the tools of which are shown more especially in Fig. 5. At this station a die holder 60 is provided having a die opening in which are mounted die inserts 61, 62 and 63, these inserts comprising the forming die. The insert 63 is provided with a hexagonal opening 64 which receives the blank and forms it into true hexagonal shape, as shown in Fig. 10.

The insert 62 is disposed at the back of the insert 63 and is provided with an opening of smaller size, thus leaving a shoulder 65 against which the blank may be upset when compressed between the insert 62 and the punch 66 carried by the gate. This punch, as shown, has a projecting end 67 which enters the indentation 55 without altering the latter to any appreciable extent.

Within the opening of the insert 62 is a cylindrical bushing 68, and the rear end of this bushing as well as the rear face of the insert 62 is backed up by the insert 61 so that these elements are held in place. The bushing 68 extends forwardly beyond the face of the insert 62 so as to project into the metal of the workpiece and form an annular recess therein, as will be later explained. A knock-out pin 69 extends through the bushing 68 and is provided with a projection 70 upon its end face to engage in the recess 53 and compress the workpiece in cooperation with the punch 66.

At this station the nut is given the form and shape shown in Fig. 10. When the rear end of the nut is upset or compressed against the knock-out pin 69, the insert 62 and the bushing 68, the latter shears downwardly about the annular rib 52 and forms an upwardly projecting annular shoulder 71 (Fig. 10) extruding the metal of the blank into the space between the knock-out pin and the bushing 68. This causes the shoulder 71 to project from the plane of the rear face of the nut and forms adjacent this shoulder an annular channel 72. Outwardly from this channel the face of the blank is flattened against the die insert 62 so as to form a flat surface 73 surrounding the recess 72.

At its front face the blank is brought down to a flat surface 74 and a relatively small edge chamfer 75, this chamfer being smaller than that shown at 56 (Fig. 9). Moreover, the corners of the hexagonal side faces of the nut are now completely filled out due to the fact that the opening in the insert 63 is of true hexagonal shape. Within the shoulder 71 is the indentation 76 leaving the web 77 to be punched out to form the opening through the blank.

It now remains to pierce the opening through the workpiece and for this purpose the blank is transferred, again without turning, to station No. 6 where, as shown in Fig. 6, the tools comprise a die 80 having an opening 81 therein and a seat 82 at its front face adapted to receive the shoulder 71 so that the bottom of this shoulder rests upon the seat 82 while the area 73 of the blank rests upon the outer face of the die. The punch holder 83 carries a piercing punch 84 which may be of the usual form to pierce the web 77 from the blank while the latter is supported against the die 80. The completed blank or workpiece is shown in Fig. 11 where the opening 85 had been perfected therethrough ready for a threading operation. There is no other change in the form of the nut due to the operations at station No. 6 except that it may be slightly expanded at its rear, as usual, due to the action of the piercing punch.

It may be found desirable to form projections upon the outer face of the die insert 62 at station No. 5 of the apparatus instead of employing a separate bushing 68. Such an arrangement is illustrated in Fig. 12 of the drawings where the die inserts 61A, 62A and 63A correspond to the elements 61, 62 and 63 of Fig. 5. In this instance, however, the insert 62A has an annular rib or projection 68A projecting outwardly into the hexagonal opening in the die insert 63A. This annular rib or projection performs the same function as the projecting end of the bushing 68, shown in Fig. 5. This arrangement is particularly desirable in making nuts of small sizes where the bushing, if used, would have to be provided with very thin walls.

Also, in some instances in making nuts of small size, it will be found that the projecting annular shoulder 71 on the nut might collapse during the piercing operation at station No. 5. If this shoulder is not sufficiently strong to withstand the pressure of the piercing operation, the nut blank may be revolved between station No. 5 and station No. 6 just as it is between stations Nos. 2 and 3 and stations Nos. 3 and 4 so that the opposite face of the nut will withstand the pressure of the piercing operation.

While I have shown and described a preferred embodiment of my invention and a preferred method of carrying out my improved process, it will be understood that the invention is not to be limited to all the details shown or to the exact steps described, but is capable of modification and variation within the spirit of the invention and within the scope of the appended claims.

What I claim is:

1. A method of making a nut blank which comprises cutting a workpiece from a length of solid stock, forming a chamfer at one face of the workpiece by the action of a suitable die and cooperating punch, then turning the workpiece end for end and, by the action of a second die and cooperating punch, forming a chamfer at the other face thereof while indenting the workpiece centrally at said one face, then again turning the workpiece end for end and forming an indentation in said other face and an annular ridge on said one face, which was previously indented, surrounding the indentation therein, and then forming said ridge into a projecting annular shoulder around said indentation and forming an annular recess surrounding said shoulder.

2. A method of making a nut blank which comprises cutting a workpiece from a length of solid stock, forming a chamfer at one face of the workpiece by the action of a suitable die and cooperating punch, then turning the workpiece end for end and, by the action of a second die and cooperating punch, forming a chamfer at the other face thereof while indenting the workpiece centrally at said one face, then again turning the workpiece end for end and forming an indentation in said other face and an annular ridge on said one face, which was also previously indented, surrounding the indentation therein, and then forming said ridge into a projecting annular shoulder around said indentation and an annular recess surrounding said shoulder while flattening the portion of the face of the blank lying outwardly of said recess.

3. A method of making a nut blank which comprises cutting a workpiece from a length of solid stock, forming a chamfer at one face of the workpiece by the action of a suitable die and cooperating punch, then turning the workpiece end for end and, by the action of a second die and cooperating punch, forming a chamfer at the other face thereof while indenting the workpiece centrally at said one face, then again turning the workpiece end for end and forming an indentation in said other face and an annular ridge on said one face, which was also previously indented, surrounding the indentation therein, and then forming said ridge into a projecting annular shoulder around said indentation and an annular recess surrounding said shoulder while flattening the portion of the face of the blank lying outwardly of said recess, and then piercing from the blank the metal lying between the indentations in the opposite faces.

4. The method of making a nut blank which comprises cutting a workpiece from a length of solid stock, inserting said workpiece into the opening of a die, and, by the action of a punch, moving relatively to the die, forming a chamfered portion upon the die face of the blank around a central flattened portion on such face, transferring the blank to the opening in a second die, turning the blank end for end during such transfer and, by the action of a suitable punch, forming a chamfered portion upon the die face of the blank in this second die and indenting the punch face of the blank while maintaining a portion of the chamfer previously formed upon the workpiece in the first die, transferring the workpiece to an opening in a third die, turning the workpiece end for end during such transfer and, by the action of a cooperating punch, indenting the punch face of the blank and forming a ridge around the indentation at the die face of the blank, and then transferring the workpiece to a fourth die without turning the same, and there forcing a sleeve member into the die face of the workpiece about said ridge to force the latter outwardly and form an outwardly projecting shoulder and an annular recess surrounding said shoulder.

5. Mechanism for forming a nut blank of bar stock comprising a cooperating die and punch, the latter being movable relatively to the die, said die having an opening therein extending through the forward face thereof and a sleeve projecting forwardly from the bottom of said opening, the outer wall of said sleeve being spaced inwardly from the inner wall of said opening, said opening being of polygonal form in cross section, and said sleeve being of circular cross section, a knock-out rod extending into said sleeve from the rear of the die, and the outer surface of the knock-out rod being spaced from the inner surface of the sleeve.

6. Mechanism for forming a nut blank of bar stock comprising a cooperating die and punch, the latter being movable relatively to the die, said die comprising an outer die insert having an opening therein of polygonal cross section and a second die insert disposed rearwardly of the first and having a circular opening therein of smaller size than the first opening, a sleeve mounted in the opening in said second die insert and extending forwardly therefrom into the polygonal opening of the first insert, the outer wall of said sleeve being spaced from the inner walls of the polygonal opening, and a knockout pin within the sleeve having the outer surface of its end portion spaced inwardly from the inner wall of the sleeve.

7. Mechanism for forming a nut blank of bar stock comprising a cooperating die and punch, the latter being movable relatively to the die, said die comprising an outer die insert having a polygonal opening therein, an intermediate die insert having a circular opening therein and an inner die insert having an opening therein of smaller size than the intermediate die insert, a sleeve in said intermediate die insert, the rear end of which rests against the face of said inner die insert and which extends outwardly into the polygonal opening in said outer die insert to form a recess in the blank.

8. The method of making a nut blank which comprises cutting a workpiece from a length of solid stock, forming, by the action of a suitable die and cooperating punch, an indentation in one face of the blank, a ridge surrounding said indentation and spaced inwardly from the peripheral edge of the blank, and a chamfered area surrounding said ridge, transferring the blank to a second die and, by the action of a punch cooperating with said second die, forcing a sleeve member into the face of the blank around said ridge to shear the metal of the blank forwardly to form an annular recess therein while extruding rearwardly the metal between said recess and indentation to form an annular projecting shoulder.

References Cited in the file of this patent

UNITED STATES PATENTS

| | | |
|---|---|---|
| 1,925,753 | Fitch et al. | Sept. 5, 1933 |
| 1,993,137 | Gibney | Mar. 5, 1935 |
| 2,080,850 | Frayer | May 18, 1937 |
| 2,170,473 | Fitch | Aug. 22, 1939 |
| 2,393,850 | Wilcox | Jan. 29, 1946 |
| 2,432,844 | Wilcox | Dec. 16, 1947 |
| 2,436,342 | Wilcox | Feb. 17, 1948 |
| 2,542,023 | Friedman | Feb. 20, 1951 |
| 2,547,801 | Wilcox | Apr. 3, 1951 |
| 2,576,906 | Poupitch | Nov. 27, 1951 |